US007231330B2

(12) United States Patent
Hernandez-Mondragon et al.

(10) Patent No.: US 7,231,330 B2
(45) Date of Patent: Jun. 12, 2007

(54) RAPID MOBILITY NETWORK EMULATOR METHOD AND SYSTEM

(75) Inventors: Edwin A. Hernandez-Mondragon, Coral Springs, FL (US); Abdelsalam A. Helal, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 367 days.

(21) Appl. No.: 10/909,588

(22) Filed: Aug. 2, 2004

(65) Prior Publication Data

US 2005/0055195 A1 Mar. 10, 2005

Related U.S. Application Data

(60) Provisional application No. 60/491,637, filed on Jul. 31, 2003.

(51) Int. Cl.
*G06F 17/50* (2006.01)
*H04L 12/56* (2006.01)
(52) U.S. Cl. ............................ 703/2; 455/423; 455/522
(58) Field of Classification Search .................. 703/2, 703/13, 14; 455/423, 522; 370/238
See application file for complete search history.

(56) References Cited

U.S. PATENT DOCUMENTS 6,011,830 A * 1/2000 Sasin et al. ............... 379/10.03
6,052,584 A * 4/2000 Harvey et al. ............. 455/423
6,735,448 B1 * 5/2004 Krishnamurthy et al. ... 455/522
6,973,039 B2 * 12/2005 Redi et al. .................. 370/238
2003/0236089 A1 * 12/2003 Beyme et al. .............. 455/423
2005/0064820 A1 * 3/2005 Park et al. ................ 455/67.11

OTHER PUBLICATIONS

Bolot, C., "End-to-End Packet Delay and Loss Behavior in the Internet", SIGCOMM'93, Sep. 1993.
Perkins, C.E., "IP Mobility Support," Request for Comments 2002, IBM, Oct. 1996.
Allman, M., et al., "ONE: The Ohio Network Emulator", TR-19972, Ohio University, Aug. 1997.
Forsberg, D., et al., "Distributing Mobility Agents Hierarchically under Frequent Location Updates", 6th IEEE Int'. Wshop. on Mobile Comp. Sys. & Apps., Feb. 1999.
Ramjee, R., et al., "HAWAII: A Domain-Based Approach for Supporting Mobility in Wide-Area Wireless NEtworks", Int'l Conf on Network Protocols ICNP'99, Oct. 1999.
Fall, K., et al., "ns Notes and Documentation, The VINT Project", Fall, 2000.

(Continued)

*Primary Examiner*—Thai Phan
(74) *Attorney, Agent, or Firm*—Akerman Senterfitt

(57) ABSTRACT

A system for emulating mobile network communications can include one or more wireless nodes configured to variably adjust signal reception sensitivity and signal transmission strength; at least one mobile node configured to wirelessly communicate with selected ones of the wireless nodes; and a network emulator communicatively linked to each wireless node. The network emulator can replicate attributes of a wired communications network. The system also can include a controller communicatively linked with the wireless nodes and configured to control signal reception sensitivity and signal transmission strength of each said wireless node, as well as a home agent configured to interact with at least one mobile node via selected ones of the wireless nodes.

21 Claims, 2 Drawing Sheets

OTHER PUBLICATIONS

Campbell, A.T., et al., "Design, Implementation, and Evaluation of Cellular IP", IEEE Personal Comm., pp. 42-49, Aug. 2000.

Pawlikowski, K., et al., "On Credibility of Simulation Studies of Telecommunication Networks", IEEE Comm., pp. 132-139, Jan. 2002.

Hernandez, E., et al., "Examining Mobile-IP Performance in Rapidly Mobile Environments: the Case of a Commuter Train", IEEE Conf. in LCN, Nov. 2001.

Campbell, A.T., et al., "Comparison of IP Micromobilitiy Protocols," IEEE Wireless Comm., pp. 72-82, Feb. 2002.

PacketStorm IP Network Emulator, PacketStorm Communications Inc., 2004.

NIST Net Home Page, National Institute of Standards and Technology (viewed May 23, 2003).

OPNET IT Guru, Intelligent Network Management for Enterprises, Opnet Technologies, Inc., 2002.

\* cited by examiner

RAPID MOBILITY NETWORK EMULATOR METHOD AND SYSTEM

CROSS-REFERENCE TO RELATED APPLICATIONS

This application claims the benefit of U.S. Provisional Application No. 60/491,637, filed in the United States Patent and Trademark Office on Jul. 31, 2003, the entirety of which is incorporated herein by reference.

BACKGROUND

1. Field of the Invention

This invention relates to the field of network emulation and, more particularly, to emulation of wireless networks.

2. Description of the Related Art

Mobile computing networks provide environments and scenarios that challenge current computing paradigms. Current network protocols frequently are unable to efficiently deal with mobility issues regarding both nomadic data and devices. In consequence, various software-based tools, referred to as simulators, and hardware-based tools, referred to as emulators, have been developed by the research community to study and improve the performance of network protocols, determine data restriction points in networks, and reduce the cost of hardware implementation.

While software-based simulation tools do provide researchers with the ability to model various networking scenarios, such systems have disadvantages. One disadvantage is that the duplication of the software development process for purposes of simulation, for example to support new operating system platforms and/or newly introduced wireless technologies, is costly, time consuming, and oftentimes impractical. As an example, to support a new network technology, each component used by a software-based network simulator, from traffic generators, Transmission Control Protocol (TCP) implementation, to application level interfaces, would have to be developed and implemented as an object file within the simulator library. Further development efforts would be required to use these objects or software components across different computing platforms.

Another disadvantage is the amount of time simulators require for performing different simulations. Typically, simulators required an amount of time that is several orders of magnitude larger than the amount of time that is being simulated. For example, on average, several hours of simulation time are needed to simulate several minutes of a given real-time network scenario. As software simulators already require a significant amount of time to model wired and/or wireless networks, the introduction of rapid mobility conditions and complex propagation models relating to mobile networks further challenges the utility and suitability of software-based simulators. Unfortunately, efforts to improve software-based simulator performance by simplifying modeling tasks through the reduction of the number of modeling parameters used during a simulation can lead to misleading, if not erroneous results.

Wire-line emulators provide researchers with a faster and more efficient alternative than software-based simulators. Several different wire-line emulators have been developed to replicate the conditions of end-to-end network delays. For example, the End-to-End Emulator as described in C. Bolot, *End-to-End Packet Delay and Loss Behavior in the Internet*, ACM Computer Communication Review, Vol., 23, No. 4, pp. 289–298 (October 1993), seeks to imitate the Internet by providing end-to-end network delay using Internet Control Message Protocol (ICMP) packets as a real time traffic source. The Ohio Network Emulator (ONE) as described in M. Allman, A. Caldwell, S. Ostermann, *ONE: The Ohio Network Emulator*, TR-19972, School of Electrical Engineering and Computer Science, Ohio University (August 1997), is able to emulate transmission, queuing, and propagation delay between two computers interconnected by a router.

Presently, however, wire-line emulators do not account for characteristics of rapid mobility networks or complex signal propagation models. As such, conventional wire-line emulators are not available or are unable to model mobile networks.

SUMMARY OF THE INVENTION

The inventive arrangements disclosed herein provide a method and system for modeling mobile networks. More particularly, the present invention utilizes both hardware and software components to model and test various mobile network configurations and scenarios. According to one embodiment of the present invention, a mobile node can be configured to wirelessly communicate with an application via one or more wireless nodes. Motion of the mobile node can be simulated by dynamically adjusting the signal reception sensitivity and signal transmission strength of each wireless node. Communications exchanged between the application and the mobile node can be monitored and tracked to study the behavior of the mobile network, including the effects of motion of the mobile node upon overall network performance.

One aspect of the present invention includes a system for emulating mobile network communications. The system can include one or more wireless nodes configured to variably adjust one or more wireless communication characteristics; at least one mobile node configured to wirelessly communicate with selected ones of the wireless nodes; and a network emulator communicatively linked to each wireless node. The wireless communication characteristics can include signal reception sensitivity and signal transmission strength of the wireless nodes. The network emulator can be configured to replicate attributes of a wired communications network. The system also can include a home agent and a controller communicatively linked with the wireless nodes. The home agent can be configured to interact with one or more of the mobile nodes via selected ones of the wireless nodes. The controller can be configured to control signal reception sensitivity and signal transmission strength of each wireless node.

According to another embodiment of the present invention, three wireless nodes can be included. In any case, each of the wireless nodes can include a wireless access point having an antenna, for example an omni-directional antenna, and a variable attenuator. The wireless nodes also can include a routing device communicatively linking the access point with the network emulator.

The controller can be configured to dynamically adjust the wireless communication characteristics of one or more of the wireless access points by varying an amount of attenuation provided by the attenuators to simulate motion of one or more of the mobile nodes. For example, attenuation provided by at least one of the attenuators can be increased while simultaneously decreasing attenuation provided by another one of the attenuators. The controller can dynamically adjust the amount of attenuation provided by at least two of the attenuators to emulate at least one mobile network characteristic such as speed, acceleration, and/or trajectory of the mobile node.

The system also can include a data logging component configured to record data throughput of one or more of the wireless nodes and/or a measure of signal strength received from at least one of the wireless nodes at one or more of the mobile nodes.

Another aspect of the present invention can include a method of emulating mobile network communications. The method can include initiating communications between a home agent and a mobile node via one or more wireless nodes; while the mobile node wirelessly communicates with at least one of the wireless nodes, dynamically adjusting one or more wireless communication characteristics of one or more of the wireless nodes to simulate movement of the mobile node; and monitoring communications in the mobile node and/or one of the wireless nodes. As noted, the wireless communication characteristics can include signal reception sensitivity and signal transmission strength of the wireless nodes.

Notably, each of the wireless nodes can include a wireless access point having an antenna and a variable attenuator. The wireless nodes further can include a routing device. The wireless nodes can be communicatively linked with the home agent through a network emulator.

According to another embodiment of the present invention, the step of dynamically adjusting the wireless communication characteristics can include varying an amount of attenuation provided by at least one of the attenuators to emulate motion of the mobile node. The present invention dynamically adjusts the amount of attenuation provided by at least one of the attenuators to emulate at least one mobile network characteristic such as speed, acceleration, and/or trajectory of the mobile node. Notably, attenuation provided by at least one of the attenuators can be increased while attenuation provided by another one of the attenuators can be simultaneously decreased.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention provides a method and system for simulating various mobile network configurations and/or scenarios. In particular, the present invention utilizes both hardware and software components to model various mobile networks. Communications exchanged between an application and a mobile node can be monitored and tracked to study the behavior of the mobile network.

The inventive arrangements disclosed herein provide a novel approach to mobile network emulation that incorporates existing software-based network simulation with wireless network hardware. Accordingly, the inventive arrangements disclosed herein provide realistic models of mobile networks and various mobile connection scenarios. Using the present invention, mobility in wireless networks can be emulated by affecting the physical parameters of the network to emulate various mobile network characteristics including, but not limited to, speed, acceleration, and/or trajectory changes of the mobile node by controlling the causality between network parameters and network behavior perceived by the mobile node.

Figure 1:
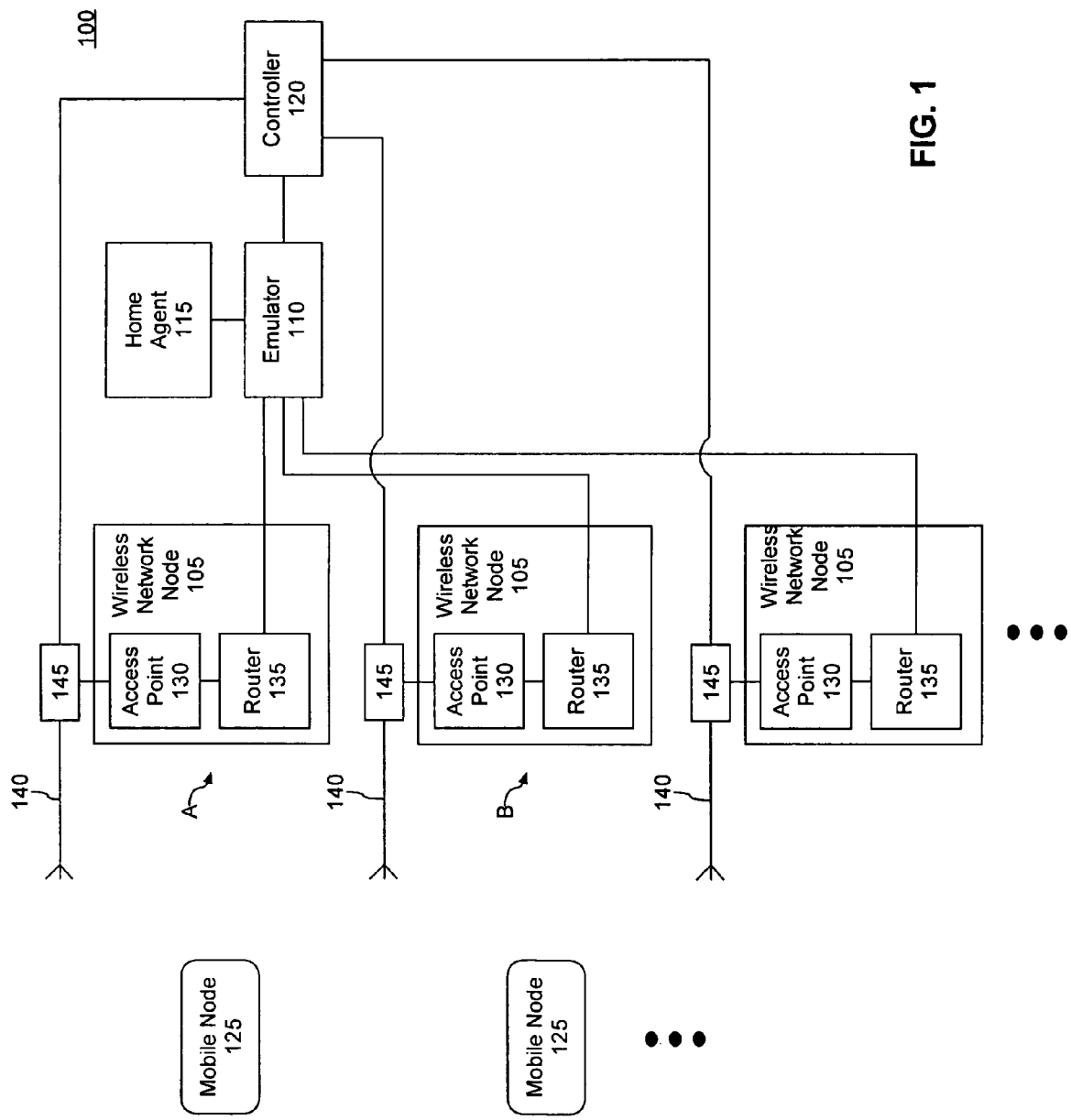
FIG. 1 is a schematic diagram illustrating a system for modeling a mobile network in accordance with one embodiment of the present invention.

FIG. 1 is a schematic diagram illustrating a system 100 for modeling a mobile network in accordance with one embodiment of the present invention. As shown, the system 100 can include one or more wireless nodes 105, an emulator 110, a home agent 115, and a controller 120. The system 100 further can include one or more mobile nodes 125. Thus, as illustrated, although only three wireless nodes 105 and two mobile nodes 125 are illustrated, those skilled in the art will recognize that any number of such components can be introduced or incorporated into the system 100 in order to emulate more diverse topologies and system architectures.

Each mobile node 125 represents a moving network node, communications device, and/or computer system. Each mobile node 125 can be a computing device having a suitable wireless communication interface. The mobile nodes 125 can be implemented as general purpose computing devices, each having a wireless transceiver such as an integrated transceiver or a separate transceiver communicatively linked to the unit, for example a wireless network interface card or other wireless peripheral attachment. For instance, the mobile node 125 can be a laptop or portable computer, a personal digital assistant, or portable telephone which has been configured to communicate using a suitable wireless communication protocol.

It will be readily appreciated by those of ordinary skill in the art that the mobile nodes 125 can be implemented as any suitable computing device having a wireless transceiver capable of communicating wirelessly with the wireless nodes 105. The mobile node 125 need not be a moveable or roaming component as the system 100 is configured to simulate motion of the mobile node 125 at any of a variety of different speeds, accelerations, or trajectories despite the mobile node 125 being stationary in nature. If desired, however, the mobile node 125 can be repositioned at any of a variety of different locations. The mobile nodes can be configured to communicate using any of a variety of different wireless communications protocols, including, but not limited to, 802.1a, 802.11b, 802.11g, 3G, Cellular-IP, and mobile-IP wireless communication protocols.

The wireless nodes 105 each can include a wireless access point 130. By using actual hardware components instead of modeling the components, the complexity of coding algorithms and the computation time required to simulate wireless communication characteristics including, but not limited to, radio-wave fading, antenna propagation, or other base station implementation details can be avoided. The wireless access points 130 can be high frequency wireless entry points configured to communicate using any of a variety of different wireless communications protocols so as to communicate with the mobile nodes 125. Any suitable wireless communication protocol can be implemented using the access points 130 and the mobile nodes 125 and, as such, can be tested using the system 100.

Each access point 130 can be a wireless access point having an antenna 140. Each antenna 140 can be an omnidirectional antenna so as to model base station signal transmission and reception behavior. Accordingly, each access point 130 can receive wireless communications via its antenna 140 and forward received wireless communications over a wired, packet-based communications network. Communications received by each wireless node 105 via the wired, packet-based communications network can be wirelessly transmitted via the antenna 140 of the receiving wireless node 105.

Each wireless node 105 also can include an attenuator 145 disposed between each wireless access point 130 and antenna 140. The attenuators 145 can be implemented as a variable or programmable attenuator for use with antennas. Each attenuator 145 can receive control signals allowing the amount of attenuation provided by that attenuator 145 to be controlled dynamically from another device. Accordingly, wireless communication characteristics such as the sensitivity of the access point with respect to both signal reception and signal transmission can be modified by adjusting the attenuators 145.

For example, by increasing the amount of attenuation provided by an attenuator 145, the power delivered from a wireless access point 130 to an attached antenna 140 for transmission as well as the power of a signal received by an antenna 140 that is delivered to the wireless access point 130 can be reduced. Decreasing the amount of attenuation allows the wireless access point 130 to deliver increased power to an attached antenna 140 for transmission as well as receive higher power signals from the attached antenna 140.

The wireless nodes 105 further can include routers 135. Although a dedicated hardware router can be used, according to another embodiment of the present invention, one or more of the routers 135 can be implemented using a computer system having appropriate routing software executing therein. The routers 135 also can include mobility management software providing thresholds and events notification to avoid system problems or failure, real-time updates on network events, automatic discovery of access points, tracking of network traffic and usage for analysis of network utilization, and data reporting and data export functions.

The controller 120 is operatively connected to each attenuator 145. Accordingly, the controller 120 can provide control signals to each attenuator 145 of the wireless nodes 105. The controller 120 can be implemented as a programmable computer system or as a standalone, dedicated controller unit. In either case, the controller 120 can variably and continually adjust the amount of attenuation provided by each attenuator 145 by sending appropriate control signals to the attenuators 145.

The controller 120 can include a suitable communications interface for communicating with each attenuator 145. While each attenuator 145 can be adjusted individually by the controller 120, according to one aspect of the present invention, the controller 120 can vary the amount of attenuation provided by each attenuator 145 in a predetermined pattern so as to model the movement of a mobile node 125. By varying the attenuation of one or more of the attenuators 145 according to a given pattern, various motion related parameters including, but not limited to, speech, acceleration, and trajectory of the mobile node 125 can be emulated. Additionally, the controller 120 can concurrently control and dynamically adjust the attenuation provided by each attenuator 145.

The emulator 110 can be a hardware or a software network emulator. According to one embodiment of the present invention, the emulator 110 can be implemented as a software-based network emulator configured to emulate various performance scenarios such as tunable packet delay distributions, congestion and background loss, bandwidth limitation, and packet reordering and duplication. For example, the emulator 110 can be implemented using a computer system executing the National Institute of Standards and Technology (NIST) emulator.

The home agent 115 can be a computing environment with which the mobile node 125 can communicate via the wireless and wired portions of system 100. For example, the home agent 115 can be one or more application programs which the mobile node 125 can access, a virtual private network (VPN) configuration, virtual environment, or the like. Because the network and transport layers of the system 100 are isolated from the home agent 115, any applications and/or other virtual environments can be tested without changing application programming interfaces (API's) to any such applications and/or virtual environments.

While the emulator 110, the home agent 115, and the controller 120 are depicted as independent components, it should be appreciated that one or more of these components can be combined into a single, more complex component. For example, the home agent 115, the emulator 110, and the controller 120, if implemented as application programs, can be included within a single computer system. Similarly, various combinations of the emulator 110, the home agent 115, and the controller 120 can be implemented in two or more computer systems.

It should be appreciated that the various components discussed with reference to FIG. 1 have been provided for purposes of illustration. As such, the present invention can be embodied in other forms. For example, according to one embodiment of the present invention, wireless nodes 105 can be provided which allow for programmatic control of signal transmission strength or power. Such an embodiment also can include an attenuation mechanism for controlling the sensitivity of the receiver portion of the wireless node. Depending upon the configuration of system 100, the controller 120 also can be communicatively linked with the emulator 110. Accordingly, functions of the controller 120 can be directed by the home agent 115 if so desired.

In operation, one of the mobile nodes 125 can begin communicating with the home agent 115. That mobile node 125 can establish a wireless communication link with the wireless node 105, labeled A (hereafter 105A). The controller 120 can be configured to initially set the attenuation level of the attenuator 145 of wireless node 105A to a minimum, or at least set the attenuation to a level which permits the mobile node 125 to communicate with the wireless node 105A. The controller 120 can continually increase the attenuation provided by the attenuator 145 of wireless node 105A to simulate mobile node 125 traveling away from the wireless node 105A.

The controller 120 can concurrently set the attenuator 145 of wireless node 105, labeled B (hereafter 105B), to maximize attenuation. That is, wireless node 105B can be set for maximum attenuation while wireless node 105A is communicating with the mobile node 125. Subsequently, while the attenuation for wireless node 105A is increasing, the controller 120 can cause the attenuation of wireless node 105B to decrease so as to simulate mobile node 125 moving away from wireless node 105A and moving toward wireless node 105B. The emulator 110 can simulate various conditions of an attached wired network. By varying the amount of attenuation provided by each attenuator 145 and the rate at which the attenuation either increases and/or decrease in each respective network node 105, the controller 120 emulates motion of the mobile node 125 for any of a variety of different trajectories, speeds, and/or accelerations. It should be appreciated that more than one mobile node 125 can be used or be active at one time.

One or more data logging components (not shown) can be disposed in one or more of the various components of the system 100. For example, the mobile node 125 can be configured to record information such as the strength of the signal received at the mobile node 125 over time. Similarly, the routers 135 and/or the access points 130 can be configured to record information including, but not limited to, the amount of data passing through each wireless node 105. The emulator 110, the home agent 115, and the controller 120 also can be configured to record transactions and component settings.

Recorded information can be time stamped for purposes of comparison with data recorded from other components. Additionally, each respective data logger can be configured to record the source of a received request. For example, each router 135 or other data logging component of the wireless nodes 105 can record which mobile node 125 is sending and/or receiving communications from that wireless node 105.

Accordingly, recorded information and network behavior can be analyzed with respect to time and varying attenuation settings for the various wireless nodes 105. For example, the strength of the signal received at the mobile node 125 can be analyzed and compared with the data throughput of each wireless node 105 over time. Such an analysis can reveal hand-off rates between the wireless nodes 105.

Figure 2:
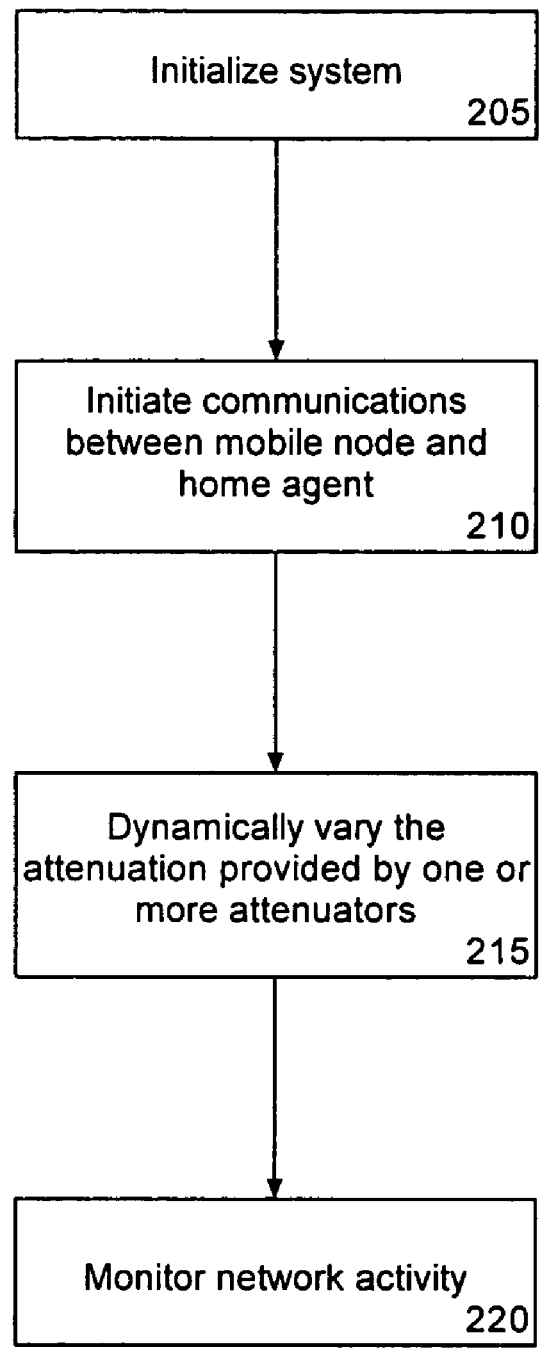
FIG. 2 is a flow chart illustrating a method of modeling a mobile network in accordance with the inventive arrangements disclosed herein.

FIG. 2 is a flow chart illustrating a method 200 of emulating mobile network communications in accordance with the inventive arrangements disclosed herein. The method can begin in step 205 where the system is initialized. The wireless nodes, the controller, and the emulator are brought online and the home agent is initialized. For example, an application program or other virtual environment that can interact with the mobile nodes can be executed or instantiated.

One or more mobile nodes can be positioned at a location (or locations) within communication range of each of the wireless nodes. For example, a mobile node can be positioned approximately 10 meters from a perimeter established by the antennas of the wireless nodes. It should be appreciated, however, that the mobile nodes can be located at any suitable distance from the wireless nodes so long as wireless communications can be exchanged between the mobile node and the wireless node when little or no attenuation is used.

In step 210, communications between the mobile node and the home agent can be initiated. For example, the mobile nodes can initiate a file transfer or some other task which can either be conducted throughout the method 200 or can be performed in an iterative manner.

In step 215, the attenuation provided by one or more of the attenuators can be dynamically varied. For example, the controller can decrease the amount of attenuation for one of the wireless nodes while increasing the amount of attenuation with respect to the other wireless nodes. In this manner, motion of the mobile node can be emulated. As noted, by varying the rate and amount of attenuation of one or more of the attenuators, different characteristics of motion such as the trajectory, speed, and/or acceleration of the mobile node can be emulated.

For example, in order to emulate speed, two factors can affect the mobile node: received signal strength and signal-to-noise ratio (SNR). As the SNR is defined by the Log (signal/noise), modifying the signal strength modifies the SNR. The SNR also can be emulated by adding randomness to the attenuation mechanism. Noise can be added in the form of a Gaussian Distribution (Normal Distribution) at a certain mean and variance. In any case, these factors can be varied from the wireless access point and can be received at the client adaptor (network card) level. Mobility is then emulated by increasing the signal strength and reception sensitivity of one wireless access point and decreasing the signal strength and reception sensitivity of the other two wireless access points. Signal strength and reception sensitivity of any two or more wireless access points can be varied to emulate a predetermined path of motion, or the trajectory, of the mobile node(s) and the wireless communication scenario under evaluation. Other wireless communication characteristics can be similarly varied. Besides signal strength, reception sensitivity, and SNR, other communication characteristics that can be varied include, for example, a bit error rate (BER).

The controller can be programmed to vary the attenuation of one or more attenuators of each of the wireless nodes to emulate mobility scenarios where the mobile node is moving at a particular speed, at a particular directional path, and over particular terrain. Equation 1 represents the path loss and the signal received by a network node at a distance d from a wireless access point.

$$S_r(dBW) = S_t(dBW) + G_t(dB_i) + G_r(dB) - K_o - n\log_{10}(d) \quad (1)$$

The values of $G_i$ indicate the gains at the both ends of an antenna, using the isotropic in $dB_i$. In other words, the signal strength received at the mobile node is the summation of all the gains ($S_t$, $G_i$) minus the propagation loss due to fading of the signal. This propagation loss depends on the many characteristics of the terrain and can be empirically defined as discussed in K. Pahlavan, A. Levesque, *Wireless Information Networks*, John Wiley & Son's, New York (1995), using different values of $K_o$ and n, depending upon different terrain conditions at different frequency values.

The experimental values and equations used for signal propagation correspond to the modeling for indoor and micro-cellular environments, as discussed in K. Pahlavan, et al., *Wireless Information Networks*, are illustrated with reference to equation 2. The empirical model indicates that the attenuation is negligible at closer distances from the antenna, and quickly, logarithmically decays at certain distances using different values of n and $K_o$. In this case, 10 and 20 are used in equation 2.

$$(2) \quad A(d) = \begin{cases} 0, & d \leq R/100 \text{ and } d \geq 1.2R \\ 10 + n\log(d), & R/100 < d \leq 0.9R \\ 20 + 10(n + 1.3)\log(d), & d > 0.9R \end{cases}$$

In equation 2, d is the distance between the wireless access point and the mobile node and R is the cell ratio having a value of 500 meters. A square attenuation model was used to determine the handoff rate between the wireless nodes as set forth in equation 3.

$$(3) \quad A(d) = \begin{cases} 0, & 0 \leq d \leq 0.9R \\ 128, & d > 0.9R \end{cases}$$

Although the attenuators can be varied to provide several different values of attenuation, acceptable values of attenuation can be determined through empirical study. For example, attenuation can range from approximately 0 to 60 dB or another range so as to prevent wireless access point signal leakage.

Accordingly, attenuation of each wireless node can be varied using the equations specified above to emulate motion of mobile nodes. As noted, various mobile network characteristics such as speeds, accelerations, and trajectories of the mobile node(s) can be emulated by varying attenuation levels. The controller and/or the home agent can be programmed to vary attenuations to emulate a variety of different mobile network characteristics. Notably, with respect to terrain, different terrains also can be emulated by mapping survey data to settings of the attenuators. As used herein, the term "terrain" can be used to refer to different natural and/or man-made landscapes. For example, "terrain" can be used to describe a mountainous landscape, a landscape having valleys, lakes, and the like. The term further can refer to urban and/or rural landscapes as well as the landscape of a city in reference to building height, placement, and the like.

In step 220, network activity can be monitored and logged. More particularly, the data throughput at each wireless node can be tracked over time and compared with the attenuation function as applied to each respective wireless node. Accordingly, by analyzing the data throughput of each wireless node, the handoff rate, or the rate at which the mobile node leaves the coverage area of one network node and enters the coverage area of another, can be determined. The signal strength as measured at the mobile node also can be monitored and compared with the attenuation function applied to the wireless nodes.

It should be appreciated that other quantities and/or characteristics can be measured and/or monitored such as the power consumed at the mobile node, the handoff protocol performance, and protocol synchronization. According to one aspect of the present invention, the performance of IP Security (IPSec) protocol and IP in IP tunneling can be evaluated, for example in the context of Mobile-IP, in conjunction with Virtual Private Networks (VPN) and Layer 2 Tunnel Protocol (L2TP) as secured links over Mobile wireless Networks. Handoff performance also can be evaluated.

Additionally, wireless communication characteristics such as authentication and authorization latencies, for example in the case of IEEE 802.11i, can be emulated. A Radius Server (authentication server) can be co-located in one of the wired nodes such that delays can be measured and wireless authentication also can be emulated. Throughput performance can be monitored for any of a variety of different communications protocols such as Mobile IP v. 6. The performance of any higher-layer protocol, including but not limited to Hypertext Transfer Protocol (HTTP), File Transfer Protocol (FTP), Universal Plug and Play (UPnP), Simple Mail Transfer Protocol (SMTP), multimedia applications over User Datagram Protocol (UDP) or TCP, and Layer-2 protocols such as WME and IEEE 802.11e can be evaluated by simply switching access points.

The present invention also can emulate other wireless communication characteristics such as load and congestion by limiting the wireless point response time. Network topologies can be emulated by setting (x,y) coordinates of the base stations or access points. A mobile node moving from point (x1, y1) to (x2, y2) will then intercept a set of access points such that handoff will occur. Depending upon the velocity equations and the location of each node in an emulated network topology, an emulated sense of location can then be acquired. Location-based services can be evaluated and tested using the present invention by mapping signal strength to a (x,y) location. Any application at the mobile node and the emulator can use (x,y) coordinates to perform handoff, create virtual foreign agents or wireless access points, and anticipate resource allocation.

While Mobile IP and Home agent were used as examples, those skilled in the art will recognize that the inventive arrangements disclosed herein can be used to emulate any Layer 2 or 3 Mobility protocol including, but not limited to Mobile IP, Mobile IP v. 6, Cellular-IP, and the like. Other protocols not requiring a Home Agent can also be emulated.

The various references disclosed throughout this application are hereby incorporated by reference.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

One or more aspects of the present invention also can be embedded in a computer program product, which comprises all the features enabling the implementation of the methods described herein, and which when loaded in a computer system is able to carry out these methods. Computer or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for emulating mobile network communications comprising:
    a plurality of fixedly-located wireless network nodes configured to variably adjust wireless communication characteristics;
    at least one mobile node configured to wirelessly communicate with selected ones of said plurality of wireless network nodes;
    a network emulator communicatively linked to each of said plurality of wireless network nodes, said network emulator configured to emulate attributes of a packet-based wired communications network for simulating network conditions experienced by said at least one mobile node in communicating with other nodes through the wired communications network, the emulated attributes comprising at least one of tunable packet-delay distribution, network congestion, bandwidth limitation, and packet re-ordering and duplication; and
    a controller communicatively linked to each of said plurality of wireless network nodes, said controller configured to control the wireless communication characteristics of each of said plurality of wireless network nodes to simulate, without changing operating parameters of said at least one mobile node, different wireless communication conditions experienced by said at least one mobile node in actual operation.

2. The system of claim 1, further comprising a home agent configured to communicatively link the at least one mobile node to said plurality of wireless network nodes and to a wired communications network whose attributes are emulated by said emulator.

3. The system of claim 1, wherein said wireless communication characteristics include a signal reception sensitivity.

4. The system of claim 1, wherein said wireless communication characteristic includes at least one of signal transmission strength, signal-to-noise ratio (SNR), and bit error rate (BER).

5. The system of claim 1, wherein at least one of said plurality of wireless network nodes includes:
   a wireless access point having an antenna and at least one variable attenuator; and
   a routing device communicatively linking said access point with said network emulator.

6. The system of claim 5, wherein said controller is configured to vary an amount of attenuation provided by said variable attenuator by dynamically adjusting at least one of a signal reception sensitivity and a signal transmission strength of said wireless access point to thereby simulate motion of said at least one mobile node.

7. The system of claim 6, wherein said variable attenuator comprises a plurality of variable attenuators; and wherein the amount of attenuation is varied by increasing attenuation provided by at least one of said plurality of variable attenuators while simultaneously decreasing attenuation provided by another one of said attenuators.

8. The system of claim 7, wherein said controller dynamically adjusts the amount of attenuation provided by at least two of said attenuators to thereby emulate at least one of speed, acceleration, and trajectory of said mobile node.

9. The system of claim 6, further comprising:
   a data logging component configured to record at least one of a data throughput of at least one of said plurality of wireless network nodes and a measure of signal strength received at said mobile node.

10. The system of claim 5, wherein said antenna is an omni-directional antenna.

11. A method of emulating mobile network communications comprising the steps of:
    initiating communications between a home agent and a mobile node via at least one fixedly-located wireless network node connected to a controller;
    while the mobile node wirelessly communicates with the at least one wireless network node, dynamically adjusting with the controller at least one wireless communication characteristic of the wireless node to simulate, without changing operating parameters of the mobile node, different wireless communication conditions experienced by the mobile node in actual operation; and
    emulating with an emulator connected to the at least one wireless network node attributes of a packet-based wired communications network to simulate network conditions experienced by the mobile node in communicating with network-connected nodes through the wired communications network, the emulated attributes comprising at least one of tunable packet-delay distribution, network congestion, bandwidth limitation, and packet re-ordering and duplication.

12. The method of claim 11, wherein the wireless communication characteristic includes signal reception sensitivity.

13. The method of claim 11, wherein wireless communications characteristic includes at least one of signal transmission strength, signal-to-noise ratio (SNR), and bit error rate (BER).

14. The method of claim 11, wherein the wireless network node comprises a wireless access point, having an antenna and a variable attenuator.

15. The method of claim 14, the wireless network node further comprising a routing device.

16. The method of claim 14, wherein the wireless network node is communicatively linked with the home agent through a network emulator.

17. The method of claim 14, said step of dynamically adjusting at least one wireless communication characteristic further comprising varying an amount of attenuation provided by the variable attenuator to emulate motion of the mobile node.

18. The method of claim 17, wherein the variable attenuator comprises a plurality of variable attenuators and further comprising the step of increasing attenuation provided by the variable attenuators while simultaneously decreasing attenuation provided by another one of the variable attenuators.

19. The method of claim 18, wherein dynamically adjusting the amount of attenuation provided by at least one of the variable attenuators emulates at least one of speed, acceleration, and trajectory of the mobile node.

20. A computer readable storage medium for use in emulating mobile network communications, the storage medium comprising computer instructions for:
    initiating communications between a home agent and a mobile node via at least one fixedly-located wireless network node connected to a controller;
    while the mobile node wirelessly communicates with the at least one wireless node, dynamically adjusting with the controller at least one wireless communication characteristic of the wireless node to simulate, without changing operating parameters of the mobile node, different wireless communication conditions experienced by the mobile node in actual operation; and
    emulating with an emulator connected to the at least one wireless network node attributes of a packet-based wired communications network to simulate network conditions experienced by the mobile node in communicating with network-connected nodes through the wired communications network, the emulated attributes comprising at least one of tunable packet-delay distribution, network congestion, bandwidth limitation, and packet re-ordering and duplication.

21. The computer readable storage medium of claim 20, wherein the at least one wireless node comprises a plurality of wireless nodes, and wherein the computer readable storage medium further comprises a computer instruction for increasing attenuation provided by a variable attenuator communicatively linked to the one of the plurality of wireless nodes while simultaneously decreasing attenuation provided by another variable attenuator communicatively linked to another of the plurality of wireless nodes.

* * * * *